US012492128B2

(12) United States Patent
Yamashita et al.

(10) Patent No.: US 12,492,128 B2
(45) Date of Patent: Dec. 9, 2025

(54) PER- AND POLYFLUOROALKYL COMPOUND-ADSORBING ACTIVATED CARBON

(71) Applicants: FUTAMURA KAGAKU KABUSHIKI KAISHA, Nagoya (JP); NATIONAL INSTITUTE OF ADVANCED INDUSTRIAL SCIENCE AND TECHNOLOGY, Tokyo (JP)

(72) Inventors: Nobuyoshi Yamashita, Tsukuba (JP); Sachi Taniyasu, Tsukuba (JP); Tsutomu Kousaka, Aichi (JP); Makoto Yokoi, Minokamo (JP); Chiharu Hori, Minokamo (JP); Kodai Shimamura, Minokamo (JP); Takuya Asano, Minokamo (JP)

(73) Assignees: FUTAMURA KAGAKU KABUSHIKI KAISHA, Nagoya (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 601 days.

(21) Appl. No.: 17/753,068

(22) PCT Filed: Aug. 11, 2020

(86) PCT No.: PCT/JP2020/030575
§ 371 (c)(1),
(2) Date: Feb. 17, 2022

(87) PCT Pub. No.: WO2021/033595
PCT Pub. Date: Feb. 25, 2021

(65) Prior Publication Data
US 2022/0289578 A1 Sep. 15, 2022

(30) Foreign Application Priority Data

Aug. 20, 2019 (JP) .................. 2019-150393
Aug. 7, 2020 (JP) .................. 2020-135048

(51) Int. Cl.
*C01B 32/30* (2017.01)
*B01D 53/70* (2006.01)
*B01J 20/20* (2006.01)
*C01B 32/354* (2017.01)

(52) U.S. Cl.
CPC ............ *C01B 32/354* (2017.08); *B01D 53/70* (2013.01); *B01J 20/20* (2013.01); *C01B 32/30* (2017.08); *C01P 2006/12* (2013.01); *C01P 2006/14* (2013.01)

(58) Field of Classification Search
CPC ....................................... C01B 32/30
See application file for complete search history.

(56) References Cited

U.S. PATENT DOCUMENTS

2007/0035055 A1\* 2/2007 Gee ........................ C01B 32/318
264/29.7
2017/0247258 A1\* 8/2017 Bae ........................ C01B 32/342
2019/0341202 A1\* 11/2019 Nishita .................. C01B 32/354

FOREIGN PATENT DOCUMENTS

| JP | 2008-55318 A | 3/2008 |
| JP | 2012-101159 A | 5/2012 |
| JP | 2013-170129 A | 9/2013 |
| JP | 2013-220413 A | 10/2013 |
| JP | 2014-95556 A | 5/2014 |
| JP | 2017-95488 A | 6/2017 |

OTHER PUBLICATIONS

International Search Report for the Application No. PCT/JP2020/030575 mailed Nov. 2, 2020.

\* cited by examiner

*Primary Examiner* — Stuart L Hendrickson
(74) *Attorney, Agent, or Firm* — Muncy, Geissler, Olds & Lowe, P.C.

(57) ABSTRACT

[SUMMARY]
[OBJECT] To provide a per- and polyfluoroalkyl compound-adsorbing activated carbon having a high collection rate of per- and polyfluoroalkyl compounds in an atmospheric sample, and a filter body using the same.
[ACHIEVING MEANS] A per- and polyfluoroalkyl compound-adsorbing activated carbon for desorbably adsorbing per- and polyfluoroalkyl compounds in an atmospheric sample, the activated carbon including an activated carbon adsorbent having a BET specific surface area of 900 m²/g or more, a sum ($V_{mic}$) of a volume of micropores of 1 nm or less of 0.35 cm³/g or more, a sum ($V_{met}$) of a volume of mesopores of 2 to 60 nm of 0.02 cm³/g or more, a volume difference ($V_s$) between the micropore volume ($V_{mic}$) and the mesopore volume ($V_{met}$) of 0.45 or more, and a surface oxide amount of 0.10 meq/g or more.

6 Claims, No Drawings

PER- AND POLYFLUOROALKYL COMPOUND-ADSORBING ACTIVATED CARBON

FIELD

The present invention relates to a per- and polyfluoroalkyl compound-adsorbing activated carbon for collecting per- and polyfluoroalkyl compounds contained in an atmospheric sample.

BACKGROUND

Per- and polyfluoroalkyl compounds are fluorine-substituted aliphatic compounds having high thermal stability, high chemical stability, and high surface modification activity. Per- and polyfluoroalkyl compounds are widely used in industrial applications such as surface treatment agents, packaging materials, liquid fire-extinguishing agents, and chemical applications which take advantage of the characteristics described above.

Since some per- and polyfluoroalkyl compounds are highly stable chemical substances, they are not easily decomposed under natural conditions after being released into the environment. For this reason, in recent years, per- and polyfluoroalkyl compounds have been recognized as Persistent Organic Pollutants (POPs), and from 2010, the production and use of perfluorooctane sulfonic acid (PFOS) (IUPAC name: 1,1,2,2,3,3,4,4,5,5,6,6,7,7,8,8,8-heptadecafluorooctane-1-sulfonic acid) are regulated under the Stockholm Convention on Persistent Organic Pollutants (POPs Convention).

Note that perfluoroalkyl compounds have a completely fluorinated linear alkyl group and are substances represented by the chemical formula (ii). Examples thereof include perfluorooctane sulfonic acid (PFOS) and perfluorooctanoic acid (PFOA) (IUPAC name: 2,2,3,3,4,4,5,5,6,6,7,7,8,8,8-pentadecafluoroocanoic acid).

[Formula 2]

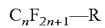

$$C_nF_{2n+1}-R \quad (ii)$$

Polyfluoroalkyl compounds refer to compounds having an alkyl group in which some of the hydrogen atoms thereof have been replaced with fluorine atoms, and are substances represented by the chemical formula (iii). Examples thereof include fluorotelomer alcohols.

[Formula 3]

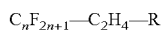

$$C_nF_{2n+1}-C_2H_4-R \quad (iii)$$

In this manner, per- and polyfluoroalkyl compounds remain in the natural world (in water, soil, and the atmosphere), and thus, establishment of quantitative test methods for per- and polyfluoroalkyl compounds are being investigated. The challenge for studying quantitative test methods is the development of collection materials having high adsorption and desorption performance of per- and polyfluoroalkyl compounds. Water or air, as a sample containing a trace amount of per- and polyfluoroalkyl compounds, is brought into contact with a collection material to collect the per- and polyfluoroalkyl compounds, and the compounds adsorbed on the collection material are desorbed into an extraction liquid by an extraction step and concentrated. After concentration, quantitative measurement can be performed with a device such as an LC-MS/MS or GC-MS/MS to measure the concentration of per- and polyfluoroalkyl compounds contained in the sample.

As an existing collection material, for example, an organic fluorine-based compound-adsorbing material composed of a cyclodextrin polymer has been proposed (Patent Literature 1). This adsorbing material is not suitable for use as a collection material used for quantitative measurement because it is specialized only for adsorption and compounds cannot be desorbed therefrom. Furthermore, the cyclodextrin polymer is in the form of a powder or fine particles, and has problems such as poor handling, high resistance during liquid passage or aeration, and a risk of outflow of the fine powder to the secondary side.

Furthermore, per- and polyfluoroalkyl compounds remain in the environment in various forms having a wide range of physicochemical properties, and existing adsorption materials do not have sufficient collection performance, whereby there is a problem in that accurate quantitative measurement cannot be performed.

The applicant has investigated activated carbon as a collection material for per- and polyfluoroalkyl compounds, and discovered that it enables the collection of per- and polyfluoroalkyl compounds and greatly contributes to accurate quantitative measurement.

CITATION LIST

Patent Literature

[PTL 1] Japanese Unexamined Patent Publication (Kokai) No. 2012-101159

SUMMARY

Technical Problem

The present invention has been conceived of in light of the points above, and in particular, provides a per- and polyfluoroalkyl compound-adsorbing activated carbon which is capable of desorbably collecting per- and polyfluoroalkyl compounds in an atmospheric sample, and a filter body using the same.

Solution to Problem

Specifically, a first invention relates to a per- and polyfluoroalkyl compound-adsorbing activated carbon for desorbably adsorbing per- and polyfluoroalkyl compounds in an atmospheric sample, the activated carbon comprising an activated carbon adsorbent having a BET specific surface area of 900 m²/g or more.

A second invention relates to the per- and polyfluoroalkyl compound-adsorbing activated carbon according to the first invention, wherein a sum ($V_{mic}$) of a volume of micropores of 1 nm or less of the activated carbon adsorbent is 0.35 cm³/g or more.

A third invention relates to the per- and polyfluoroalkyl compound-adsorbing activated carbon according to the first or second invention, wherein a sum ($V_{met}$) of a volume of mesopores of 2 to 60 nm of the activated carbon adsorbent is 0.02 cm³/g or more. In the present application, the "mesopores" of the activated carbon adsorbent having a pore size of 2 to 60 nm may be referred to simply as "pores" which have a pore size of 2 to 60 nm.

A fourth invention relates to the per- and polyfluoroalkyl compound-adsorbing activated carbon according to any one of the first through third inventions, wherein a volume difference ($V_s$) between the sum ($V_{mic}$) of the volume of micropores and the sum ($V_{met}$) of the volume of mesopores of the activated carbon adsorbent as determined by the following formula (i) is 0.45 or more.

[Formula 1]

$$V_s = V_{mic} - V_{met} \quad \text{(i)}$$

A fifth invention relates to the per- and polyfluoroalkyl compound-adsorbing activated carbon according to any one of the first through fourth inventions, wherein a surface oxide amount of the activated carbon adsorbent is 0.10 meq/g or more.

A sixth invention relates to the per- and polyfluoroalkyl compound-adsorbing activated carbon according to any one of the first through fifth inventions, wherein the activated carbon adsorbent is a fiber-like activated carbon.

A seventh invention relates to a per- and polyfluoroalkyl compound-adsorbing activated carbon filter body, wherein the adsorbing activated carbon according to any one of the first through sixth inventions is retained therein.

Advantageous Effects of Invention

According to the per- and polyfluoroalkyl compound-adsorbing activated carbon according to the first invention, since there is provided a per- and polyfluoroalkyl compound-adsorbing activated carbon for desorbably adsorbing per- and polyfluoroalkyl compounds in an atmospheric sample, the activated carbon comprising an activated carbon adsorbent having a BET specific surface area of 900 m²/g or more, the compounds, which have been considered difficult to quantitatively measure, can be desorbably collected.

According to the per- and polyfluoroalkyl compound-adsorbing activated carbon according to the second invention, since in the first invention, a sum ($V_{mic}$) of a volume of micropores of 1 nm or less of the activated carbon adsorbent is 0.35 cm³/g or more, per- and polyfluoroalkyl compounds can be efficiently desorbably collected.

According to the per- and polyfluoroalkyl compound-adsorbing activated carbon according to the third invention, since in the first or second invention, a sum ($V_{met}$) of a volume of mesopores of 2 to 60 nm of the activated carbon adsorbent is 0.02 cm³/g or more, per- and polyfluoroalkyl compounds can be efficiently desorbably collected.

According to the per- and polyfluoroalkyl compound-adsorbing activated carbon according to the fourth invention, since in any one of the first through third inventions, a volume difference ($V_s$) between the sum ($V_{mic}$) of the volume of micropores and the sum ($V_{met}$) of the volume of mesopores of the activated carbon adsorbent as determined by the following formula (i) is 0.45 or more, per- and polyfluoroalkyl compounds can be efficiently desorbably collected.

According to the per- and polyfluoroalkyl compound-adsorbing activated carbon according to the fifth invention, since in any one of the first through fourth inventions, a surface oxide amount of the activated carbon adsorbent is 0.10 meq/g or more, not only can adsorption performance be provided due to the pores of activated carbon, but also chemical adsorption ability can be provided, and the adsorption performance for per- and polyfluoroalkyl compounds can be further improved.

According to the per- and polyfluoroalkyl compound-adsorbing activated carbon according to the sixth invention, since in any one of the first through fifth inventions, the activated carbon adsorbent is a fiber-like activated carbon, the contact efficiency with the per- and polyfluoroalkyl compounds is increased, whereby adsorption performance can be improved.

According to the per- and polyfluoroalkyl compound-adsorbing activated carbon filter body according to the seventh invention, since the adsorbing activated carbon according to any one of the first through sixth inventions is retained therein, it is possible to provide good handleability while increasing the collect efficiency of per- and polyfluoroalkyl compounds.

DESCRIPTION OF EMBODIMENTS

The per- and polyfluoroalkyl compound-adsorbing activated carbon of the present invention is composed of a fiber-like activated carbon or a granular activated carbon. The fiber-like activated carbon is an activated carbon obtained by carbonizing and activating appropriate fibers, and examples thereof include phenol resin type, acrylic resin type, cellulose type, and coal pitch type activated carbons. The fiber length, cross-sectional diameter, etc., are appropriate.

Examples of the raw material of granular activated carbons include raw materials such as wood (waste wood, wood from thinning, and sawdust), coffee bean pomace, rice husks, coconut husks, hark, and fruit nuts. These naturally derived raw materials tend to develop pores by carbonization and activation. Furthermore, since the use thereof is a secondary use of waste, they can be procured at low cost. Baked products derived from synthetic resins such as tires, petroleum pitch, urethane resins, phenol resins, and coal can also be used as raw materials.

The activated carbon raw material is carbonized by heating in a temperature range of 200° C. to 600° C., if necessary, to form fine pores. Next, the activated carbon raw material is exposed to steam and carbon dioxide gas in a temperature range of 600° C. to 1200° C. and activated. As a result, activated carbon having various developed pores is completed. Alternatively, for example, zinc chloride activation can be used as the activation. Furthermore, sequential cleaning is also performed.

The physical properties of the activated carbon produced in this manner define the adsorption performance of the substance to be adsorbed. The adsorption performance of the activated carbon for adsorbing per- and polyfluoroalkyl compounds, which are the target substances to be adsorbed of the present invention, is defined by the specific surface area, which is an index representing the amount of pores formed in the activated carbon. Note that as used herein, the specific surface area of each preparation example is measured by the BET method (Brunauer, Emmett and Teller method).

Activated carbon is also defined by the pore size of the pores. In the case of an adsorbent material such as activated carbon, all of micropores, mesopores, and macropores are present. Depending on which range of pores among these are better developed, the target and performance of activated carbon adsorb will change. The activated carbon of the present invention is desired to effectively and desorbably adsorb molecules of per- and polyfluoroalkyl compounds.

Furthermore, acidic functional groups are present on the surface of activated carbon. The acidic functional groups, which increase due to surface oxidation of the activated carbon, are primarily hydrophilic groups such as carboxyl groups and phenolic hydroxyl groups. Acidic functional groups on the surface of the activated carbon affect the collection capability. The amount of these acidic functional groups can be understood as the surface oxide amount. When the surface oxide amount of the activated carbon is increased, the hydrophilicity of the surface of activated carbon is increased, and it is considered that the collection performance of fluorotelomer alcohols having a hydrophilic group in particular among per- and polyfluoroalkyl compounds is improved.

Examples of the method for increasing the surface oxide of activated carbon include the following methods. One is a method of promoting the oxidation of surface residues by repeating the heating step to increase the number of acidic functional groups. This is oxidation in air or oxygen atmosphere. Alternatively, at the same time, air having a temperature of 25 to 40° C. and a humidity of 60 to 90% is also introduced under an air atmosphere. Then, by heating at 150 to 900° C. for 1 to 10 hours, activated carbon having an increased surface oxide amount can be obtained. It is considered that due to heating with moist air, hydrocarbon groups such as alkyl groups present on the surface of the activated carbon are oxidized and hydroxyl groups of water are introduced to the surface, whereby the amount of acidic functional groups is increased.

Another method is to oxidize the surface of the activated carbon with an oxidizing agent to increase the surface oxides. Examples of the oxidizing agent include hypochlorous acid and hydrogen peroxide. Activated carbon having an increased surface oxide amount can be obtained by immersing activated carbon in a liquid containing such an oxidizing agent and then drying. The amount of acidic functional groups on the surface of the activated carbon can be measured as the surface oxide amount, as shown in each Preparation Example described later.

The adsorption performance of the activated carbon for desorbably adsorbing per- and polyfluoroalkyl compounds in an atmospheric sample is exhibited by setting the specific surface area to 900 m$^2$/g or more, as derived from the Examples described later. When the pores of the activated carbon are formed to a certain level or more, the adsorption performance of the compounds is secured.

Further, it was found that the distribution of pores formed on the activated carbon also contributes to the adsorption of per- and polyfluoroalkyl compounds in the atmospheric sample. As used herein, "micropores" refers to pores having a pore diameter of 1 nm or less, and as can be derived from the Examples described later, and when the total pore volume ($V_{mic}$) of the micropores is 0.35 cm$^3$/g or more, the adsorption performance of per- and polyfluoroalkyl compounds in the atmospheric sample is improved. As used herein, the volume of micropores of 1 nm or less in each Preparation Example is measured by the MP method (Micropore method). It is considered that the compounds are easily collected in the pores when micropores are formed to a certain level or more.

Furthermore, as used herein, "mesopores" refers to pores having a pore diameter in the range of 2 to 60 nm, and as can be derived from the Examples described later, when the total pore volume ($V_{met}$) of the mesopores is 0.02 cm$^{-3}$/g or more, the adsorption performance of per- and polyfluoroalkyl compounds in the atmospheric sample is improved. As used herein, the volume of mesopores in the range of 2 to 60 nm of each Preparation Example is measured by the DH method (Dollimore-Heal method). Since measurement is performed by the DH method, the measurement target is pores of 2.43 to 59.72 nm. It is considered that the compounds can easily penetrate into even the micropores when mesopores are formed to a certain level or more.

Additionally, it is considered that the difference between the pore volume of micropores and the pore volume of mesopores also contributes to the efficient adsorption of per- and polyfluoroalkyl compounds. As derived from the Examples described later, by setting the volume difference ($V_s$) between the sum of the micropore volume ($V_{mic}$) and the sum of the mesopore volume ($V_{met}$) to 0.45 or more, the per- and polyfluoroalkyl compounds in the atmospheric sample can be efficiently and desorbably adsorbed. It is considered that by using activated carbon with well-developed micropores in addition to not overdeveloping mesopores, the adsorption performance of per- and polyfluoroalkyl compounds is improved and the compounds can be smoothly desorbed at the time of the subsequent extraction operation, whereby quantitative measurement can be satisfactorily carried out.

Next, by setting the surface oxide amount to 0.10 meq/g or more, the hydrophilicity of the surface of the activated carbon can be enhanced, and the per- and polyfluoroalkyl compounds in the atmospheric sample can be efficiently adsorbed.

EXAMPLES

[Activated Carbon Adsorbents Used]

The inventors used the following raw materials to produce per- and polyfluoroalkyl compound-adsorbing activated carbons.

Fiber-Like Activated Carbon

Fiber-like activated carbon "CF" (average fiber diameter: 15 μm): produced by Futamura Chemical Co., Ltd. {hereinafter referred to as C1};

Fiber-like activated carbon "FE3010" (average fiber diameter: 15 μm): produced by Futamura Chemical Co., Ltd. {hereinafter referred to as C2};

Fiber-like activated carbon "FE3012" (average fiber diameter: 15 μm): produced by Futamura Chemical Co., Ltd. {hereinafter referred to as C3};

Fiber-like activated carbon "FE3013" (average fiber diameter: 15 μm): produced by Futamura Chemical Co., Ltd. {hereinafter referred to as C4-};

Fiber-like activated carbon "FE3015" (average fiber diameter: 15 μm): produced by Futamura Chemical Co., Ltd. {hereinafter referred to as C5};

Fiber-like activated carbon "FE3018" (average fiber diameter: 15 μm): produced by Futamura Chemical Co., Ltd. {hereinafter referred to as C6};

Granular Activated Carbon

Coconut shell activated carbon "CW480SZ" (average particle size: 250 μm): produced by Futamura Chemical Co., Ltd. {hereinafter referred to as C7}; and Phenol formaldehyde activated carbon "QW250" (average particle size: 250 μm): produced by Futamura Chemical Co., Ltd. {hereinafter referred to as C8}.

[Collection Performance of Per- and Polyfluoroalkyl Compounds in Atmospheric Sample—Experiment 1]

The inventors conducted Collection Experiment 1 of per- and polyfluoroalkyl compounds in an atmospheric sample using the following Preparation Examples 1 to 5.

PRODUCTION OF PREPARATION EXAMPLES

Preparation Example 1

The fiber-like activated carbon "CF" (C1) obtained by carbonizing phenol resin fibers, which are the same raw material as FE3010, at 600° C. was used as the activated carbon of Preparation Example 1.

Preparation Example 2

The fiber-like activated carbon "FE3015" (C5) produced by Futamura Chemical was used as the activated carbon of Preparation Example 2.

Preparation Example 3

10 g of the fiber-like activated carbon "FE3010" (C2) produced by Futamura Chemical was immersed in 500 ml of a 6% concentration hydrogen peroxide solution, allowed to stand for 150 hours, then removed and dried to obtain the activated carbon of Preparation Example 3.

Preparation Example 4

10 g of the fiber-like activated carbon "FE3015" (C5) produced by Futamura Chemical was immersed in 500 ml of a 6% concentration hydrogen peroxide solution, allowed to stand for 70 hours, then removed and dried to obtain the activated carbon of Preparation Example 4.

Preparation Example 5

10 g of the fiber-like activated carbon "FE3018" (C6) produced by Futamura Chemical was immersed in 500 ml of a 6% concentration hydrogen peroxide solution, allowed to stand for 50 hours, then removed and dried to obtain the activated carbon of Preparation Example 5.

[Activated Carbon—Measurement 1]
[Surface Oxide Amount]

For the surface oxide amount (meq/g), using the Boehm method, the adsorbing activated carbon of each Example was shaken in a 0.05 N sodium hydroxide aqueous solution, filtered, and the filtrate was neutralized with 0.05 N hydrochloric acid. The amount of sodium hydroxide at the time of titration was used as the surface oxide amount.

[BET Specific Surface Area]

The specific surface area (m²/g) was determined by the BET method by measuring the nitrogen adsorb isotherm at 77 K using the automatic specific surface area/pore distribution measuring device "BELSORP-mini II" produced by MicrotracBEL Corporation.

[Average Pore Diameter]

The average pore diameter (nm) was calculated from formula (iv) using the values of the pore volume (cm³/g) and the specific surface area (m²/g), assuming that the shape of the pores is cylindrical.

[Formula 4]

$$\text{Average pore diameter (nm)} = \left[\frac{\text{Pore volume (cm}^3/\text{g)}}{\text{Specific Surface Area (m}^2/\text{g)}}\right] \times 4 \times 1000 \quad \text{(iv)}$$

Table 1 shows the physical characteristics of the activated carbons of Preparation Examples 1 to 5. From the top of Table 1, the surface oxide amount (meq/g), BET specific surface area (m²/g), average pore diameter (nm), and average fiber diameter (μm) are shown.

TABLE 1

| | Prep Ex 1 | Prep Ex 2 | Prep Ex 3 | Prep Ex 4 | Prep Ex 5 |
|---|---|---|---|---|---|
| Surface oxide amount (meq/g) | 0.03 | 0.21 | 0.41 | 0.48 | 0.42 |
| BET specific surface area (m²/g) | 138 | 1540 | 791 | 1463 | 1920 |
| Average pore diameter (nm) | 1.87 | 1.64 | 1.56 | 1.69 | 1.85 |
| Average fiber diameter (μm) | 15 | 15 | 15 | 15 | 15 |

[Collection Efficiency of Per- and Polyfluoroalkyl Compounds in Atmospheric Sample—Measurement 1]

Evaluation was performed using fluorotelomer alcohols (hereinafter referred to as "FTOHs") and ethylperfluorooctanosulfamide (IUPAC name: N-ethyl-1,1,2,2,3,3,4,4,5,5,6,6,7,7,8,8,8-heptadecafluorooctane-1-sulfoamide) (hereinafter referred to as "N-EtFOSA") as the per- and polyfluoroalkyl compounds. FTOHs are substances represented by the above-mentioned chemical formula (ii), and the substance names differ depending on the number of carbon atoms. For example, in the case of $C_8F_{17}CH_2CH_2OH$, this FTOH is referred to as 8:2FTOH (IUPAC name: 3,3,4,4,5,5,6,6,7,7,8,8,9,9,10,10,10-heptadecafluoro-1-decanol). N-EtFOSA is a substance represented by the following chemical formula (v).

[Formula 5]

$$C_8F_{17}\text{—}SO_2N(C_2H_5)\text{—}C_2H_4\text{—}H \quad \text{(v)}$$

Each standard substance was diluted to 100 ppb with methanol, 100 μl thereof was added to a flexible polyurethane foam (PUF), and this was set in the first stage. Next, 1.2 g of the adsorbing activated carbon of the Preparation Example was filled in a case having a diameter of 45 mm in the second stage, and air at 22 to 24° C. was aerated through the first stage PUF and the second stage fiber-like activated carbon at a rate of 20 l/min for 48 hours.

After aeration, the activated carbon adsorbent of the Preparation Example was sufficiently contact-stirred with 15 ml of a mixed solvent containing dichloromethane and ethyl acetate as main components, followed by centrifugation and solid-liquid separation, and an extract was collected.

The extract was quantitatively measured using a GC-MS/MS (Quatri micro GC manufactured by Waters Corporation) in MRM mode, and the collection performance was confirmed.

Table 2 shows the recovery rate (%) of fluorotelomer alcohol (FTOH) for each target substance for the activated carbons of Preparation Examples 1 to 5. The target substances are 4:2FTOH (IUPAC name: 3,3,4,4,5,5,6,6,6-nonafluoro-1-hexanol), 6:2FTOH (IUPAC name: 3,3,4,4,5,5,6,6,7,7,8,8,8-tridecafluoro-1-octanol), 8:2FTOH, 10:2FTOH (IUPAC name: 3,3,4,4,5,5,6,6,7,7,8,8,9,9,10,10,11,11,12,12,12-heneicosafluoro-1-dodecanol), and N-EtFOSA.

TABLE 2

|  |  | Prep Ex 1 | Prep Ex 2 | Prep Ex 3 | Prep Ex 4 | Prep Ex 5 |
|---|---|---|---|---|---|---|
| Target Substance | 4:2FTOH | ND | 17 to 32% | 45 to 87% | 99 to 118% | 20 to 58% |
|  | 6:2FTOH | 1.6 to 1.8% | 18 to 26% | 51 to 67% | 66 to 73% | 50 to 63% |
|  | 8:2FTOH | 6.4 to 6.5% | 26 to 32% | 164 to 220% | 86 to 135% | 125 to 139% |
|  | 10:2FTOH | ND | 140 to 160% | 390 to 420% | 135 to 150% | 430 to 440% |
|  | N—EtFOSA | 38 to 45% | 53% | 100% | 108% | 205% |

Note that in the tables, "ND" indicates that the value is below the quantifiable lower limit. In some cases, the recovery rate was 150% or more due to the co-elution phenomenon in which the mass number affects the same fragment.

[Collection Performance of Per- and Polyfluoroalkyl Compounds in Atmospheric Sample—Experiment 2]

Next, the inventors reexamined the optimum transition and collision energy of the MRM mode of the GC-MS/MS using Preparation Examples 6 to 21 below, and under more accurate analytical conditions, performed Collection Experiment 2 of per- and polyfluoroalkyl compounds in an atmospheric sample.

PRODUCTION OF PREPARATION EXAMPLES

Preparation Example 6

10 g of the fiber-like activated carbon "CF" (C1) produced by Futamura Chemical was used as the activated carbon of Preparation Example 6.

Preparation Example 7

10 g of the fiber-like activated carbon "CF" (C1) produced by Futamura Chemical was immersed in 500 ml of a 4.2% concentration hydrogen peroxide solution, allowed to stand for 220 hours, then removed and dried to obtain the activated carbon of Preparation Example 7.

Preparation Example 8

10 g of the fiber-like activated carbon "FE3010" (C2) produced by Futamura Chemical was used as the activated carbon of Preparation Example 8.

Preparation Example 9

10 g of the fiber-like activated carbon "FE3010" (C2) produced by Futamura Chemical was immersed in 500 ml of a 4.2% concentration hydrogen peroxide solution, allowed to stand for 150 hours, then removed and dried to obtain the activated carbon of Preparation Example 9.

Preparation Example 10

10 g of the fiber-like activated carbon "FE3012" (C3) produced by Futamura Chemical was used as the activated carbon of Preparation Example 10.

Preparation Example 11

10 g of the fiber-like activated carbon "FE3012" (C3) produced by Futamura Chemical was immersed in 500 ml of a 4.2% concentration hydrogen peroxide solution, allowed to stand for 100 hours, then removed and dried to obtain the activated carbon of Preparation Example 11.

Preparation Example 12

10 g of the fiber-like activated carbon "FE3013" (C4) produced by Futamura Chemical was immersed in 500 ml of a 1.5% concentration hydrogen peroxide solution, allowed to stand for 70 hours, then removed and dried to obtain the activated carbon of Preparation Example 12.

Preparation Example 13

10 g of the fiber-like activated carbon. "FE3015" (C5) produced by Futamura Chemical was used as the activated carbon of Preparation Example 13.

Preparation Example 14

10 g of the fiber-like activated carbon "FE3015" (C5) produced by Futamura Chemical was immersed in 500 ml of a 1.5% concentration hydrogen peroxide solution, allowed to stand for 40 hours, then removed and dried to obtain the activated carbon of Preparation Example 14.

Preparation Example 15

10 g of the fiber-like activated carbon "FE3015" (C5) produced by Futamura Chemical was immersed in 500 ml of a 4.2% concentration hydrogen peroxide solution, allowed to stand for 70 hours, then removed and dried to obtain the activated carbon of Preparation Example 15.

Preparation Example 16

10 g of the fiber-like activated carbon "FE3015" (C5) produced by Futamura Chemical was immersed in 500 ml of a 14.0% concentration hydrogen peroxide solution, allowed to stand for 350 hours, then removed and dried to obtain the activated carbon of Preparation Example 16.

Preparation Example 17

10 g of the fiber-like activated carbon "FE3015" (C5) produced by Futamura Chemical was immersed in 500 ml of a 18.9% concentration hydrogen peroxide solution, allowed to stand for 480 hours, then removed and dried to obtain the activated carbon of Preparation Example 17.

Preparation Example 18

10 g of the fiber-like activated carbon "FE3018" (C6) produced by Futamura Chemical was used as the activated carbon of Preparation Example 18.

Preparation Example 19

10 g of the fiber-like activated carbon "FE3018" (C6) produced by Futamura Chemical was immersed in 500 ml of a 4.2% concentration hydrogen peroxide solution, allowed to stand for 50 hours, then removed and dried to obtain the activated carbon of Preparation Example 19.

Preparation Example 20

10 g of the coconut shell activated carbon "CW480SZ" (C7) produced by Futamura Chemical was immersed in 500 ml of a 4.2% concentration hydrogen peroxide solution, allowed to stand for 70 hours, then removed and dried to obtain the activated carbon of Preparation Example 20.

Preparation Example 21

10 g of the phenol formaldehyde activated carbon "QW250" (C8) produced by Futamura Chemical was immersed in 500 ml of a 4.2% concentration hydrogen peroxide solution, allowed to stand for 70 hours, then removed and dried to obtain the activated carbon of Preparation Example 21.

[Activated Carbon—Measurement 2]

The surface oxides, specific surface area, and average pore diameter of Preparation Examples 6 to 21 were determined in the same manner as in "Activated Carbon—Measurement 1" above.

[Micropore Volume]

The pore volume was measured by nitrogen adsorption using an automatic specific surface area/pore distribution measuring device ("BELSORP-mini II", manufactured by MicrotracBEL Corporation). The sum of the micropore volume ($V_{mic}$) ($cm^3/g$), which is the pore volume in the range of pore diameters of 1 nm or less, of Preparation Examples 6 to 21, was obtained by analyzing the value of dV/dD in the range of pore diameters of 1 nm or less from the t-plot of the adsorption isotherm of nitrogen gas by the MP method.

[Mesopore Volume]

The dV/dD values in the pore diameter range of 2 to 60 nm were analyzed by the DH method from the adsorption isotherm of nitrogen gas. The diameter range of the pore diameters of 2 to 60 nm in the analysis software is 2.43 to 59.72 nm. From this analysis result, the sum ($V_{met}$) ($cm^3/g$) of the mesopore volume, which is the pore volume in the range of pore diameters of 2 to 60 nm, of Preparation Example 6 to 21 was obtained.

[Volume Difference]

The volume difference ($V_s$) of Preparation Examples 6 to 21 is a value obtained by subtracting the sum of the mesopore volume ($V_{met}$) ($cm^3/g$) from the sum of the micropore volume ($V_{mic}$) ($cm^3/g$), and was calculated from the above formula (i).

The physical characteristics of the activated carbons of Preparation Examples 6 to 21 are shown in Tables 3 and 4. From the top of Table 3, there are surface oxide amount (meq/g), BET specific surface area ($m^2/g$), average pore diameter (nm), micropore volume ($V_{mic}$) ($cm^3/g$), mesopore volume ($V_{met}$) ($cm^3/g$), and volume difference ($V_s$) ($cm^3/g$).

TABLE 3

|  |  | Prep Ex 6 | Prep Ex 7 | Prep Ex 8 | Prep Ex 9 | Prep Ex 10 | Prep Ex 11 |
| --- | --- | --- | --- | --- | --- | --- | --- |
| Surface oxide amount | (meq/g) | 0.05 | 0.3 | 0.1 | 0.41 | 0.15 | 0.57 |
| BET specific surface area | ($m^2/g$) | 526 | 482 | 825 | 769 | 951 | 989 |
| Average pore diameter | (nm) | 1.94 | 1.98 | 1.54 | 1.53 | 1.59 | 1.61 |
| Micropore volume ($V_{mic}$) | ($cm^3/g$) | 0.195 | 0.168 | 0.345 | 0.315 | 0.380 | 0.394 |
| Mesopore volume ($V_{met}$) | ($cm^3/g$) | 0.069 | 0.074 | 0.001 | 0.004 | 0.026 | 0.031 |
| Volume difference (Vs) | ($cm^3/g$) | 0.126 | 0.094 | 0.344 | 0.311 | 0.354 | 0.363 |

TABLE 4

|  |  | Prep Ex 12 | Prep Ex 13 | Prep Ex 14 | Prep Ex 15 | Prep Ex 16 |
| --- | --- | --- | --- | --- | --- | --- |
| Surface oxide amount | (meq/g) | 0.19 | 0.10 | 0.20 | 0.48 | 0.92 |
| BET specific surface area | ($m^2/g$) | 1320 | 1572 | 1543 | 1474 | 1356 |
| Average pore diameter | (nm) | 1.65 | 1.76 | 1.65 | 1.64 | 1.73 |
| Micropore volume ($V_{mic}$) | ($cm^3/g$) | 0.531 | 0.796 | 0.641 | 0.612 | 0.546 |
| Mesopore volume ($V_{met}$) | ($cm^3/g$) | 0.048 | 0.094 | 0.038 | 0.041 | 0.036 |
| Volume difference (Vs) | ($cm^3/g$) | 0.483 | 0.702 | 0.603 | 0.571 | 0.510 |

TABLE 5

|  |  | Prep Ex 17 | Prep Ex 18 | Prep Ex 19 | Prep Ex 20 | Prep Ex 21 |
|---|---|---|---|---|---|---|
| Surface oxide amount | (meq/g) | 1.10 | 0.10 | 0.42 | 0.38 | 0.86 |
| BET specific surface area | (m$^2$/g) | 1341 | 2017 | 1949 | 1700 | 1966 |
| Average pore diameter | (nm) | 1.71 | 1.89 | 1.84 | 1.99 | 2.08 |
| Micropore volume ($V_{mic}$) | (cm$^3$/g) | 0.545 | 0.841 | 0.838 | 0.679 | 0.729 |
| Mesopore volume ($V_{met}$) | (cm$^3$/g) | 0.075 | 0.124 | 0.117 | 0.234 | 0.414 |
| Volume difference (Vs) | (cm$^3$/g) | 0.470 | 0.717 | 0.721 | 0.445 | 0.315 |

[Collection Efficiency of Per- and Polyfluoroalkyl Compounds in Atmospheric Sample—Measurement 2]

Preparation Examples 6 to 21 were evaluated using FTOHs as the per- and polyfluoroalkyl compounds in the same manner as in Collection Experiment 1 above.

Each standard substance was diluted with methanol to 100 ng/ml (100 ppb), 100 μl thereof was added to flexible polyurethane foam (PUF), and this was set in the first stage. Next, the activated carbon of the Preparation Example was filled in a case having a diameter of 47 mm in the second stage so that the thickness at the time of filling became approximately 2 mm, and air at 22 to 24° C. was aerated through the first stage PUF and the second stage fiber-like activated carbon at a rate of 20 l/min for 48 hours.

After aeration, the activated carbon of the Preparation Example was transferred to a PP centrifuge tube (capacity: 15 ml), and 10 ml of a mixed solvent containing dichloromethane and ethyl acetate as main components was added thereto. The centrifuge tube was shaken at 225 rpm for 10 minutes, and an extract was then collected. This extraction process was repeated twice in succession, and a total of 30 ml of extract was collected.

The collected extract was concentrated to 1 ml by a nitrogen spray concentrator, and the extract was then quantitatively measured using a GC-MS/MS ("GCMS-TQ8050", manufactured by Shimadzu Corporation) in MRM mode, and the collection performance was confirmed.

Tables 6 to 8 show the recovery rate (%) of fluorotelomer alcohols (FTOHs) for each target substance for the activated carbons of Preparation Examples 6 to 21. The target substances are 4:2FTOH (IUPAC name: 3,3,4,4,5,5,6,6,6-nonafluoro-1-hexanol), 6:2FTOH (IUPAC name: 3,3,4,4,5,5,6,6,7,7,8,8,8-tridecafluoro-1-octanol), 8:2FTOH and 10:2FTOH (IUPAC name: 3,3,4,4,5,5,6,6,7,7,8,8,9,9,10,10,11,11,12,12,12-heneicosafluoro-1-dodecanol).

TABLE 6

|  |  | Prep Ex 6 | Prep Ex 7 | Prep Ex 8 | Prep Ex 9 | Prep Ex 10 | Prep Ex 11 |
|---|---|---|---|---|---|---|---|
| Target Substance | 4:2FTOH | ND | ND | ND | ND | 56% | 65% |
|  | 6:2FTOH | ND | ND | ND | ND | 60% | 64% |
|  | 8:2FTOH | ND | ND | ND | ND | 77% | 71% |
|  | 10:2FTOH | ND | ND | ND | ND | 61% | 53% |

TABLE 7

|  |  | Prep Ex 12 | Prep Ex 13 | Prep Ex 14 | Prep Ex 15 | Prep Ex 16 |
|---|---|---|---|---|---|---|
| Target Substance | 4:2FTOH | 83% | 66% | 79% | 79% | 74% |
|  | 6:2FTOH | 73% | 77% | 78% | 87% | 70% |
|  | 8:2FTOH | 98% | 58% | 78% | 87% | 81% |
|  | 10:2FTOH | 90% | 92% | 83% | 93% | 79% |

TABLE 8

|  |  | Prep Ex 17 | Prep Ex 18 | Prep Ex 19 | Prep Ex 20 | Prep Ex 21 |
|---|---|---|---|---|---|---|
| Target Substance | 4:2FTOH | 71% | 75% | 79% | 45% | 45% |
|  | 6:2FTOH | 98% | 57% | 74% | 62% | 62% |
|  | 8:2FTOH | 89% | 74% | 87% | 51% | 51% |
|  | 10:2FTOH | 89% | 85% | 85% | 39% | 39% |

Note that in the tables, "ND" indicates that the value is below the quantifiable lower limit. Compared with Collection Experiment 1, for each numerical value, variation of the measured mass spectrometry value was suppressed.

Results and Discussion

In Preparation Examples 6 to 9, the recovery rate was below the lower limit of quantification for each of the FTOHs, and the adsorption of the target substances was insufficient. It is presumed that the adsorption performance was not exhibited due to a lack of pores or specific surface area required for the adsorption of the target substances.

Preparation examples 10 to 21 were capable of recovering each of FTOHs. When the BET specific surface area was 900 m$^2$/g or more, it was shown that the target substances were adsorbed. It is inferred that the parameter of the specific surface area of activated carbon has a certain effect on the adsorption performance of each FTOH. In particular, Preparation Examples 10 to 19, which were fiber-like activated carbons, showed good results of 50% or more in the recovery rate of FTOHs. From the viewpoint of the contact efficiency between the target substance and the activated carbon, it is considered that FTOH adsorption can be performed more efficiently by using fiber-like activated carbon.

It was also shown that the adsorption performance of FTOHs was higher when activated carbon with developed micropores and mesopores was used. In Preparation Examples 6 and 7, it is considered that since neither micropores nor mesopores were developed, no FTOH was adsorbed. In preparation examples 8 and 9, it is considered that since micropores were developed but mesopores were not, the number of mesopores present on the inlet side of the pores of the activated carbon was small, whereby the FTOH molecules were not smoothly introduced into the micropores and were not adsorbed.

Since it is considered that Preparation Examples 10 to 21 had large pore volumes of both micropores and mesopores and both pores were sufficiently developed, it can be inferred that the molecules of FTOH were smoothly introduced into the pores of the activated carbon and excellent adsorption performance was demonstrated. Preparation Examples 12 to 19 demonstrated particularly excellent FTOH recovery performance. Preparation Examples 12 to 19 are each characterized in that the pore volume of the micropores is large and the pore volume of the mesopores is not particularly large though the pores of the mesopores are developed. It is considered that after adsorbing the FTOH molecules in the micropores, the molecules were likely to be smoothly desorbed out of the pores during the extraction operation, and thus, a particularly good recovery rate was demonstrated.

Conversely, Preparation Examples 20 and 21 are considered to be activated carbons having pores developed in a complicated manner from large pores to small pores because the pore volumes of both the micropores and the mesopores are large. It is presumed that the molecules of FTOH adsorbed in the complicatedly developed pores were less likely to be smoothly desorbed during the extraction operation, and the recovery rate of FTOH was slightly inferior to that of Preparation Examples 12 to 19. In light of these results, it can be understood that the sum of the pore volumes of the micropores ($V_{mic}$) of the activated carbon, the sum of the pore volume of the mesopores ($V_{mes}$), and the volume difference (Vs), which is the difference therebetween, affect the FTOH recovery rate.

In addition to the pore conditions of the activated carbon, it was examined whether improving the surface oxide amount would improve affinity with FTOH having a hydrophilic group and improve the FTOH adsorption performance. Regarding Preparation Example 13 and Preparation Examples 14 to 17, which had the same activated carbon raw material, Preparation Examples 14 to 17, in which the surface oxide amount was increased, demonstrated better adsorption performance. Likewise, regarding Preparation Example 18 and Preparation Example 19, Preparation Example 19 having a large surface oxide amount demonstrated better adsorption performance. Thus, it can be understood that it is possible to further improve the FTOH adsorption performance by increasing the surface oxide amount of the activated carbon.

INDUSTRIAL APPLICABILITY

Since the per- and polyfluoroalkyl compound-adsorbing activated carbon of the present invention can desorbably adsorb per- and polyfluoroalkyl compounds in an atmospheric sample, quantitative measurement of these compounds, which was not possible with existing collection materials, has become possible. This enables effective quantitative evaluation of Persistent Organic Pollutants.

The invention claimed is:

1. A per- and polyfluoroalkyl compound-adsorbing activated carbon for desorbably adsorbing per- and polyfluoroalkyl compounds in an atmospheric sample, the activated carbon comprising
    an activated carbon adsorbent having a BET specific surface area of 900 m$^2$/g or more, wherein
    a sum ($V_{mic}$) of a volume of micropores of the activated carbon adsorbent having a pore size less than 1 nm or less is 0.35 cm$^3$/g or more, and
    a sum ($V_{mes}$) of a volume of mesopores of the activated carbon adsorbent having a pore size of 2 to 60 nm is 0.02 cm$^3$/g or more, and
    a ratio of the sum ($V_{mes}$) of the volume of mesopores which have a pore size of 2 to 60 nm with respect to the sum ($V_{mic}$) of the volume of micropores which has a pore size of 1 nm or less is ranged from 6 to 15%.

2. The per- and polyfluoroalkyl compound-adsorbing activated carbon according to claim 1, wherein
    a surface oxide amount of the activated carbon adsorbent is 0.10 meq/g or more.

3. The per- and polyfluoroalkyl compound-adsorbing activated carbon according to claim 1, wherein
    the activated carbon adsorbent has a fiber shape.

4. A per- and polyfluoroalkyl compound-adsorbing activated carbon filter body, wherein
    the filter body contains the adsorbing activated carbon according to claim 1.

5. The per- and polyfluoroalkyl compound-adsorbing activated carbon according to claim 2, wherein
    the activated carbon adsorbent has a fiber shape.

6. A per- and polyfluoroalkyl compound-adsorbing activated carbon filter body, wherein
    the filter body contains the adsorbing activated carbon according to claim 2.

* * * * *